US010321024B2

(12) United States Patent
Nakamura

(10) Patent No.: US 10,321,024 B2
(45) Date of Patent: Jun. 11, 2019

(54) IMAGE CAPTURING METHOD AND IMAGE CAPTURING APPARATUS

(71) Applicant: HITACHI KOKUSAI ELECTRIC INC., Tokyo (JP)

(72) Inventor: Kazuhiko Nakamura, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 111 days.

(21) Appl. No.: 15/509,503

(22) PCT Filed: Sep. 26, 2014

(86) PCT No.: PCT/JP2014/075655
§ 371 (c)(1),
(2) Date: Mar. 8, 2017

(87) PCT Pub. No.: WO2016/046959
PCT Pub. Date: Mar. 31, 2016

(65) Prior Publication Data
US 2017/0295302 A1    Oct. 12, 2017

(51) Int. Cl.
*H04N 5/225* (2006.01)
*H04N 9/04* (2006.01)
(Continued)

(52) U.S. Cl.
CPC ......... *H04N 5/225* (2013.01); *G02B 27/1006* (2013.01); *G02B 27/1013* (2013.01);
(Continued)

(58) Field of Classification Search
CPC .................................................. H04N 5/2258
See application file for complete search history.

(56) References Cited

U.S. PATENT DOCUMENTS

2005/0190270 A1*   9/2005   Park ................... H04N 5/23293
348/222.1
2005/0254714 A1*  11/2005   Anne .................. H04M 1/7253
382/233
(Continued)

FOREIGN PATENT DOCUMENTS

| JP | 2000-270340 A | 9/2000 |
| JP | 2008-199403 A | 8/2008 |
| JP | 2008-211273 A | 9/2008 |

OTHER PUBLICATIONS

International Search Report of PCT/JP2014/075655 dated Dec. 22, 2014.

*Primary Examiner* — Paulos M Natnael
(74) *Attorney, Agent, or Firm* — Mattingly & Malur, PC

(57) ABSTRACT

A color-separation optical system for image capture includes three rolling shutter CMOS image capturing elements of B, G and R, respectively capturing: an image of B at the speed of an integer N multiple of the number of output picture frames, an image of G at the speed of an integer M multiple of N+1, and an image of R at the speed of the integer M multiple of N+1. The vertical synchronization phases of the captured image frames of B, G and R, are offset by approximately half the vertical synchronization period of an even multiple of speed such that the center phases of the captured image frames of B, G and R have approximately the same vertical synchronization phase. A picture to be output uses the vertical effective pictures of the captured image frames having approximately the same vertical synchronization phase.

2 Claims, 7 Drawing Sheets

(51) Int. Cl.
  *G02B 27/10*    (2006.01)
  *G02B 27/14*    (2006.01)
  *H04N 1/50*     (2006.01)
  *H04B 10/2581*  (2013.01)

(52) U.S. Cl.
  CPC ....... *G02B 27/1086* (2013.01); *G02B 27/141* (2013.01); *H04N 5/2254* (2013.01); *H04N 5/2258* (2013.01); *H04N 9/045* (2013.01); *H04B 10/2581* (2013.01); *H04N 1/502* (2013.01)

(56) References Cited

U.S. PATENT DOCUMENTS

| | | | | |
|---|---|---|---|---|
| 2012/0212619 A1* | 8/2012 | Nagamune | ............ | H04N 5/2256 348/164 |
| 2014/0320695 A1* | 10/2014 | Ozawa | ............... | H04N 5/35563 348/229.1 |
| 2016/0198103 A1* | 7/2016 | Tanaka | ................... | G03B 15/05 348/164 |
| 2017/0237887 A1* | 8/2017 | Tanaka | ................... | G03B 7/091 348/164 |

\* cited by examiner

IMAGE CAPTURING METHOD AND IMAGE CAPTURING APPARATUS

TECHNICAL FIELD

The disclosure relates to an image capturing apparatus, which is applicable to, for example, the image capturing apparatus with function for converting the picture signal from the image capturing element, and outputting the converted signal.

BACKGROUND ART

Generally, the color TV camera allows a color-separation optical system to separate the image capturing light from the photographic lens into three colors constituted by a red component, a green component, and a blue component. Objects corresponding to the respective color components are subjected to image capturing by the image capturing element such as CCD so as to produce color TV pictures (for example, Japanese Patent Application Laid-Open No. 2000-270340).

CITATION LIST

Patent Literature

PTL 1: Japanese Patent Application Laid-Open No. 2000-270340

SUMMARY OF INVENTION

Technical Problem

The television camera which uses the color-separation optical system and three image capturing elements is configured to offset each axial position of red and blue image capturing elements from the axial position of the green image capturing element by the amount corresponding to the typical value of the axial chromatic aberration for pasting on the color-separation optical system so as to simplify manufacturing of the zoom lens.

If the zoom lens for three elements is combined with the single-plate color image capturing element via the adaptor with dummy glass for the color-separation optical system, each axial position of the red and blue image capturing elements becomes different from that of the green image capturing element by the amount corresponding to the typical value of the axial chromatic aberration. This may deteriorate modulation degree both of red and green.

It is an object of the present invention to provide the image capturing technique which lessens focal plane shutter distortion even in the use of the CMOS image capturing element while widening the dynamic range.

Solution to Problem

The outline of the disclosure will be described as below.

The image capturing method for an image capturing apparatus having a color-separation optical system and three or more CMOS image capturing elements (rolling shutters) includes: (a) capturing an image of B at the speed of an integer N multiple of the number of output picture frames, capturing an image of G or (G1 and G2) at the speed of an integer M multiple of an integer N+1 or more, and capturing an image of R at the speed of the integer M multiple of the integer N+1 or more; (b) offsetting a vertical synchronization phases of the captured image frames of B, G, R, or B, G1, G2, R, which are to be used for an output picture, by approximately half a vertical synchronization period of an even multiple of speed such that each center phase of the captured image frames of B, G, R, or B, G1, G2, R has approximately the same vertical synchronization phase; and (c) using, for the output picture, vertical effective pictures of the captured image frames of B, G, R, or B, G1, G2, R having approximately the same vertical synchronization phase.

Advantageous Effects of Invention

The disclosure ensures to lessen the focal plane shutter distortion even in the use of the CMOS image capturing element while widening the dynamic range.

DESCRIPTION OF EMBODIMENTS

Figure 1A:
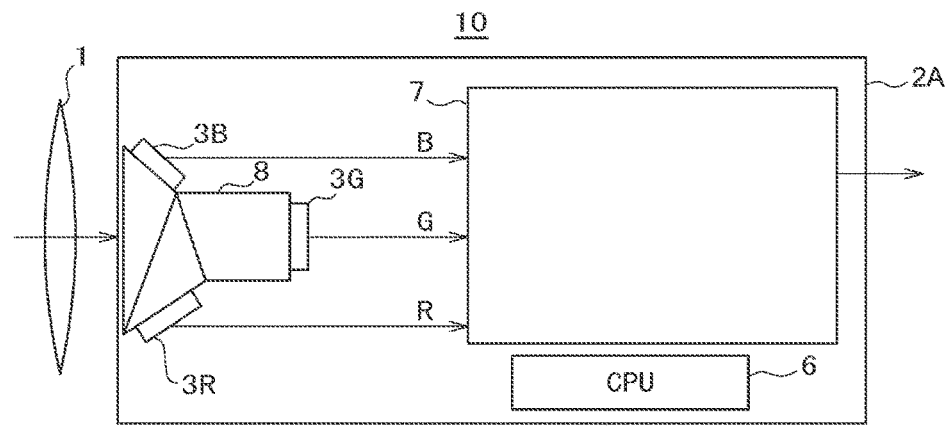
FIG. 1A is a block diagram showing function of a camera system according to a first embodiment.

Embodiments, examples, and comparative examples will be described referring to the drawings. In the following description, the same components will be designated with the same codes, and explanations thereof may be omitted.

A camera system structure according to the first embodiment will be described referring to FIG. 1A. A camera system 10 according to the first embodiment includes a lens 1 and an image capturing apparatus 2A. The image capturing apparatus 2A includes a blue (B) CMOS image capturing element 3B, a green (G) CMOS image capturing element 3G, a red (R) CMOS image capturing element 3R, a CPU 6, a picture signal processing circuit 7 having a timing generation circuit (TG) and a frame speed conversion, and a three-color-separation optical system 8. The picture signal processing circuit 7 includes an FPGA and a frame memory. The camera system 10 outputs the picture having the same pixel number as that of the image captured by the three elements of RGB.

The CMOS image capturing element 3B captures an image of B at the speed of an integer N multiple of the number of output picture frames. The CMOS image capturing element 3G captures an image of G at the speed of an integer M multiple of an integer N+1 or more of the number of output picture frames. The CMOS image capturing element 3R captures an image of R at the speed of the integer M multiple of the integer N+1 or more of the number of output picture frames. The TG of the picture signal processing circuit 7 generates a vertical synchronization signal pulse derived from offsetting the vertical synchronization phases of captured image frames of B, G, R by substantially half the vertical synchronization period of an even multiple of speed so that each center phase of the captured image frames of B, G, R used for an output picture has substantially the same vertical synchronization phase. The vertical effective pictures of the captured image frames of B, G, R at substantially the same vertical synchronization phases will be used for the output picture.

Figure 1B:
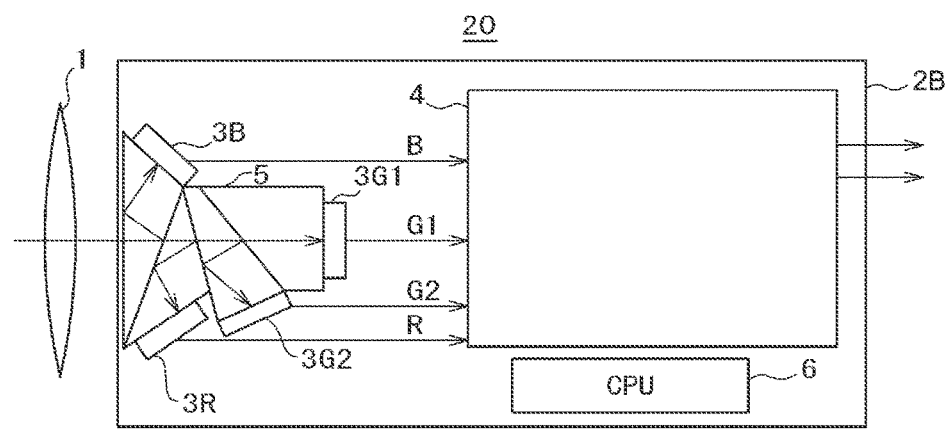
FIG. 1B is a block diagram showing function of a camera system according to a second embodiment.

A camera system structure according to the second embodiment will be described referring to FIG. 1B. A camera system 20 according to the second embodiment includes the lens 1 and an image capturing apparatus 2B. The image capturing apparatus 2B includes the blue (B) CMOS image capturing element 3B, a first green (G1) CMOS image capturing element 3G1, a second green (G2) CMOS image capturing element 3G2, and the red (R) CMOS image capturing element 3R, the CPU 6, a picture signal processing circuit 4 having the TG, the frame speed conversion, and an interpolation process, and a four-color-separation optical system 5. The picture signal processing circuit 4 includes the FPGA and the frame memory. The camera system 20 outputs the picture having the vertically and horizontally multiplied pixel number of that of the image captured by the four elements of RG1G2B.

The CMOS image capturing element 3B captures an image of B at the speed of the integer N multiple of the number of output picture frames. The CMOS image capturing element 3G1 captures an image of G1 at the speed of the integer M multiple of the integer N+1 or more of the number of output picture frames. The CMOS image capturing element 3G2 captures an image of G2 at the speed of the integer M multiple of the integer N+1 or more of the number of output picture frames. The CMOS image capturing element 3R captures an image of R at the speed of the integer M multiple of the integer N+1 or more of the number of output picture frames. The TG of the picture signal processing circuit 4 generates a vertical synchronization signal derived from offsetting the vertical synchronization phases of captured image frames of B, G1, G2, R by substantially half the vertical synchronization period of an even multiple of speed so that each center phase of the captured image frames of B, G1, G2, R used for the output picture has substantially the same vertical synchronization phase. The vertical effective pictures of the captured image frames of B, G1, G2, R at substantially the same vertical synchronization phases will be used for the output picture.

The image capturing method according to the embodiment is implemented for the image capturing apparatus having the color-separation optical system and three or more CMOS image capturing elements. The CMOS image capturing element may be not only the global shutter CMOS image capturing element, but also the focal plane shutter (rolling shutter) CMOS image capturing element. The image capturing method includes the steps of:

(a) capturing an image of B at the speed of an integer N multiple of the number of output picture frames, capturing an image of G or (G1 and G2) at the speed of an integer M multiple of an integer N+1 or more, and capturing an image of R at the speed of the integer M multiple of the integer N+1 or more;

(b) offsetting a vertical synchronization phases of the captured image frames of B, G, R, or B, G1, G2, R, which are to be used for an output picture, by approximately half a vertical synchronization period of an even multiple of speed such that each center phase of the captured image frames of B, G, R, or B, G1, G2, R has approximately the same vertical synchronization phase; and (c) using, for the output picture, vertical effective pictures of the captured image frames of B, G, R, or B, G1, G2, R having approximately the same vertical synchronization phase.

The image capturing apparatus having the color-separation optical system and the three or more CMOS image capturing elements in the form of three or more focal plane shutters includes:

(a) means (TG) for generating and applying a vertical synchronization signal derived from offsetting a vertical synchronization phases of captured image frames of B, G, R, or B, G1, G2, R by approximately half a vertical synchronization period at an even multiple of speed, and a vertical synchronization signal without offsetting the vertical synchronization period at an odd multiple of speed;

(b) a CMOS image capturing element for image capturing of B at a speed of an integer N multiple of the number of output picture frames in synchronization with the vertical synchronization signal derived from offsetting by approximately half the vertical synchronization period at an even multiple of speed;

(c) a CMOS image capturing element for image capturing of G or (G1 and G2) at a speed of an integer M multiple of an integer N+1 or more in synchronization with the vertical synchronization signal without offsetting the vertical synchronization period at an odd multiple of speed;

(d) a CMOS image capturing element for image capturing of R at a speed of the integer M multiple of the number of the integer N+1 or more in synchronization with the vertical synchronization signal without offsetting the vertical synchronization period at the odd multiple of speed; and (e) a picture signal processing circuit including frame speed conversion means (frame memory).

The embodiment ensures to lessen the focal plane shutter distortion while widening the dynamic range even in the use of the zoom lens for three elements, the color-separation optical system, and three or more monochrome rolling shutter CMOS image capturing elements, which have been widely distributed in the broadcasting station and the production house.

The embodiment ensures to lessen the focal plane shutter distortion while widening the dynamic range even in the use of the rolling shutter CMOS image capturing elements. The use of not only the expensive global shutter CMOS image capturing element but also the inexpensive rolling shutter CMOS image capturing element with low power consumption ensures to lessen the focal plane shutter distortion while widening the dynamic range.

Example 1

An explanation will be made with respect to structure and operation of the image capturing apparatus according to a first example (Example 1) referring to FIGS. 3A and 2A. An image capturing apparatus 2A1 according to the first example is used for the camera system 10 according to the first embodiment while capturing images of R at X2 speed, G at X3 speed, and B at the equal speed.

Figure 3A:
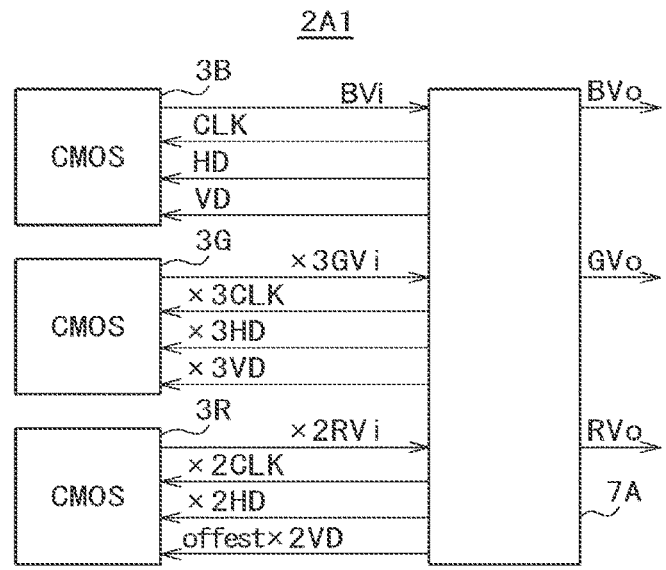
FIG. 3A is a block diagram showing a circuit of the image capturing apparatus according to the first example.

Referring to FIG. 3A, the image capturing apparatus 2A1 includes a picture signal processing circuit 7A having the TG and the frame speed conversion, a CMOS image capturing element (CMOS image capturing element of G) 3G constituted by integrating peripheral circuit of green (G), a CMOS image capturing element (CMOS image capturing element of R) 3R constituted by integrating peripheral circuit of red (R), and a CMOS image capturing element (COMS image capturing element of B) 3B constituted by integrating peripheral circuit of blue (B). The picture signal processing circuit 7A includes the FPGA and the frame memory.

The CMOS image capturing element 3R receives inputs of a clock at a multiple speed (X2CLK), a horizontal synchronization signal at a multiple speed (X2HD), a vertical synchronization signal at a multiple speed with offset phase (Offset X 2VD), and outputs a picture signal at a multiple speed with offset phase (X2RVi). The CMOS image capturing element 3G receives inputs of the clock at X3 speed (X3CLK), the horizontal synchronization signal at X3 speed (X3HD), and the vertical synchronization signal at X3 speed (X3VD), and outputs the picture signal at X3 speed (X3GVi). The CMOS image capturing element 3B receives inputs of the clock (CLK), the horizontal synchronization signal (HD), and the vertical synchronization signal (VD) each at the equal speed, and outputs the picture signal at the equal speed (BVi). The picture signal processing circuit 7A receives an input of the picture signal at a multiple speed (X2RVi), outputs the picture signal (RVo), receives an input of the picture signal at X3 speed (X3GVi), outputs the picture signal (GVo), receives an input of the picture signal at the equal speed (BVi), and outputs the picture signal (BVo).

Figure 2A:
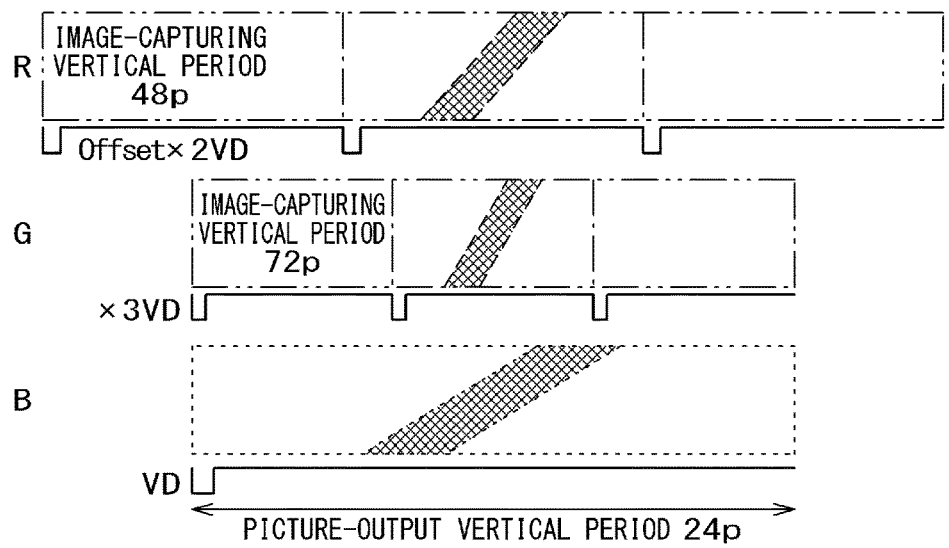
FIG. 2A is a schematic view showing operation of an image capturing apparatus according to a first example.

Referring to FIG. 2A, as the CMOS image capturing element 3R receives an input of the vertical synchronization signal derived from offsetting the vertical synchronization phase of the captured image frame of R by approximately half the vertical synchronization period at a multiple speed (even multiple of speed), each center phase of the captured image frames of B, G, R used for the output picture has substantially the same vertical synchronization phase. Assuming that the picture output vertical period is set to 24 p (24 frames/sec.), the image capturing vertical period of R at a multiple speed becomes 48 p, the image capturing vertical period of G at X3 speed becomes 72 p, and the image capturing vertical period of B at the equal speed becomes 24 p.

In the case of capturing images of B at the equal speed, R at X2 speed, and G at X3 speed from converted actually measured values of the CMOS image capturing elements of G: −1 dB, R: +2.8 dB, B: +10 dB, the dynamic range is maximized with the values of G: +8 dB, R: +9 dB, B: +10 dB having an error of 2 dB by utilizing the fact that human eyes have the lowest resolution for blue, the next lowest resolution for red, and the high resolution for green.

The image capturing apparatus according to the first example may be configured to allow the camera system 20 according to the second embodiment to capture images of R at X2 speed, G1 and G2 each at X3 speed, and B at the equal speed, respectively.

The image capturing apparatus according to the first example generates and feeds the vertical synchronization signal derived from offsetting the center phase at X2 speed by approximately half the frame at substantially X2 speed to the CMOS image capturing element of R for image capturing at X2 speed, generates and feeds the vertical synchronization signal derived from aligning the center phase at X3 speed to the CMOS image capturing element of G1 and G2, or G for image capturing at X3 speed, and generates and feeds the vertical synchronization signal derived from aligning the center phase at the equal speed to the CMOS image capturing element of B for image capturing at the equal speed.

Example 2

An explanation will be made with respect to structure and operation of the image capturing apparatus according to a second example (Example 2) referring to FIGS. 3B and 2B. An image capturing apparatus 2B2 according to the second example is used for the camera system 20 according to the second embodiment while capturing images of R at X2 speed, G1 at X2 speed, G2 at X2 speed, and B at the equal speed.

Figure 3B:
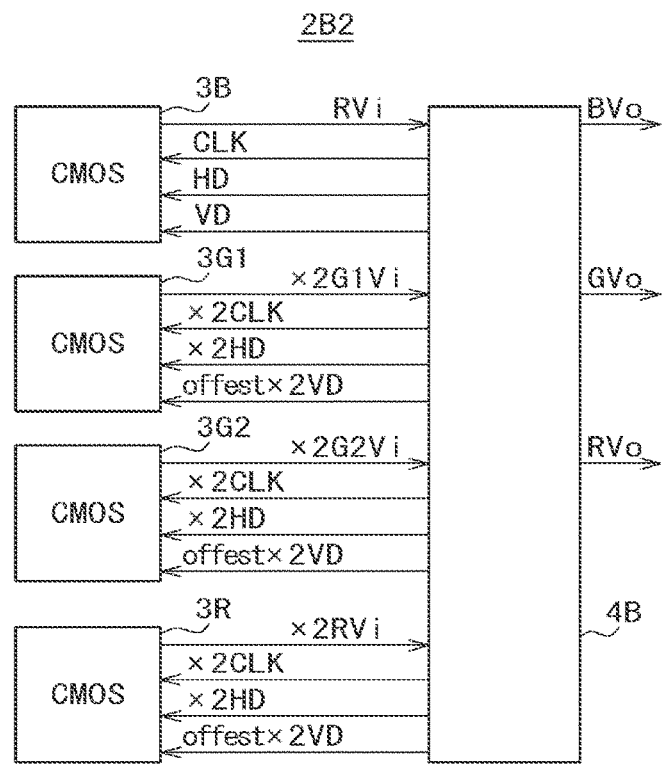
FIG. 3B is a block diagram showing a circuit of the image capturing apparatus according to the second example.

As FIG. 3B shows, the image capturing apparatus 2B2 includes a picture signal processing circuit 4B having the TG, the frame speed conversion, and an interpolation process, a CMOS image capturing element (CMOS image capturing element of G1) 3G1 constituted by integrating peripheral circuit of the first green (G1), a CMOS image capturing element (CMOS image capturing element of G2) 3G2 constituted by integrating peripheral circuit of the second green (G2), a CMOS image capturing element 3R of R, and a CMOS image capturing element (CMOS image capturing element of B) 3B of B. The video signal processing circuit 4B includes the FPGA and the frame memory.

The CMOS image capturing element 3R receives inputs of a clock at a multiple speed (X2CLK), a horizontal synchronization signal at a multiple speed (X2HD), a vertical synchronization signal at a multiple speed with offset phase (Offset X 2VD), and outputs a picture signal at a multiple speed with offset phase (X2RVi). The CMOS image capturing element 3G1 receives inputs of the clock at a multiple speed (X2CLK), a horizontal synchronization signal at a multiple speed (X2HD), and a vertical synchronization signal at a multiple speed with offset phase (Offset X 2VD), and outputs the picture signal at a multiple speed with offset phase (X2G1Vi). The CMOS image capturing element 3G2 receives inputs of the clock at a multiple speed (X2CLK), the horizontal synchronization signal at a multiple speed (X2HD), and the vertical synchronization signal at a multiple speed with offset phase (Offset X 2VD), and outputs the picture signal at a multiple speed with offset phase (X2G2Vi). The CMOS image capturing element 3B receives inputs of the clock (CLK), the horizontal synchronization signal (HD), and the vertical synchronization signal (VD) each at the equal speed, and outputs the picture signal at the equal speed (BVi). The picture signal processing circuit 4B receives an input of the picture signal at a multiple speed (X2RVi), outputs the picture signal (RVo), receives inputs of the picture signals each at a multiple speed (X2G1Vi) and (X2G2Vi), outputs the picture signal (GVo), receives an input of the picture signal (BVi) at the equal speed, and outputs the picture signal (BVo).

Figure 2B:
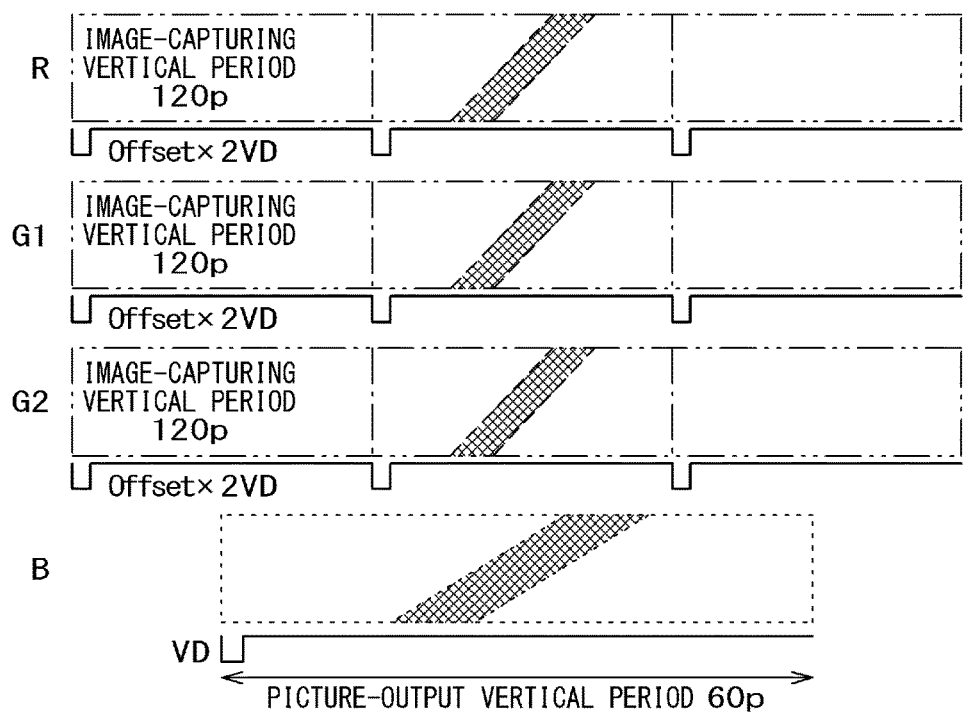
FIG. 2B is a schematic view showing operation of an image capturing apparatus according to a second example.

As FIG. 2B shows, as the CMOS image capturing element 3R receives an input of the vertical synchronization signal derived from offsetting the vertical synchronization phase of the captured image frame of R by approximately half the vertical synchronization period at a multiple speed (even multiple of speed), the CMOS image capturing element 3G1 receives an input of the vertical synchronization signal derived from offsetting the vertical synchronization phase of the captured image frame of G1 by approximately half the vertical synchronization period at a multiple speed (even multiple of speed), and the CMOS image capturing element 3G2 receives an input of the vertical synchronization signal derived from offsetting the vertical synchronization phase of the captured image frame of G2 by approximately half the vertical synchronization period at a multiple speed (even multiple of speed). As a result, each center phase of the captured image frames of B, G (G1, G2), and R used for the output picture has substantially the same vertical synchronization phase. Assuming that the picture output vertical period is set to 60 p (60 frames/sec.), the image capturing vertical period of R at a multiple speed becomes 120 p, the image capturing vertical period of G1 at a multiple speed becomes 120 p, the image capturing period of G2 at a multiple speed becomes 120 p, and the image capturing vertical period of B at the equal speed becomes 60 p.

In the case of capturing images of B at the equal speed, R at X2 speed, G1 at X2 speed, and G2 at X2 speed from actually measured values of the CMOS image capturing elements of G1: 5 dB, G2: 5 dB, R: +2.8 dB, B: +10 dB, the dynamic range is maximized with the values of G: +11 dB, R: +9 dB, B: +10 dB having the error of 2 dB by utilizing the fact that human eyes have the lowest resolution for blue.

The image capturing apparatus according to the second example is used for the camera system 10 according to the first embodiment while capturing images of R at X2 speed, G at X2 speed, and B at the equal speed, respectively.

The image capturing apparatus according to the second example generates and feeds the vertical synchronization signal derived from offsetting the center phase by approximately half the frame at substantially X2 speed to the CMOS image capturing element of R at X2 speed for image capturing at X2 speed, generates and feeds the vertical synchronization signal derived from offsetting the center phase by approximately half the frame at substantially X2 speed to the CMOS image capturing elements of G1 and G2, or G at X2 speed for image capturing at X2 speed, and generates and feeds the vertical synchronization signal derived from aligning the center phase at the equal speed to the CMOS image capturing element of B at the equal speed.

Example 3

An explanation will be made with respect to structure and operation of the image capturing apparatus according to a third example (Example 3) referring to FIGS. 3C and 2C. An image capturing apparatus 2A3 according to the third example is used for the camera system 10 according to the first embodiment while capturing images of R at X3 speed, G at X4 speed, and B at X2 speed.

Figure 3C:
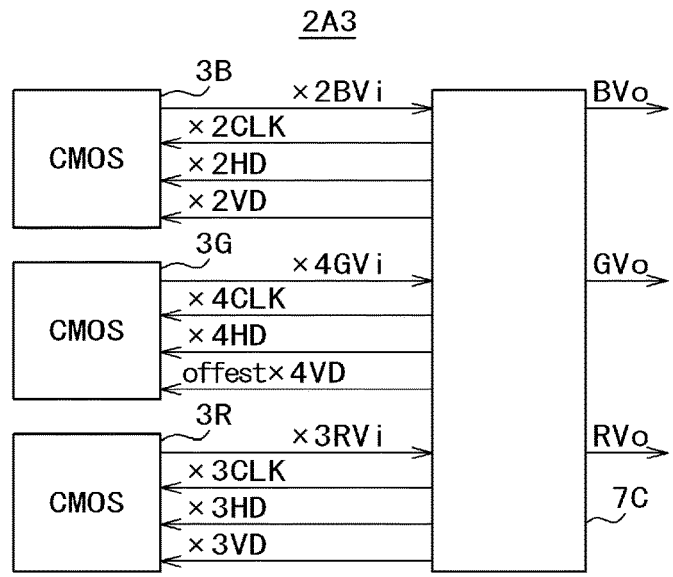
FIG. 3C is a block diagram showing a circuit of the image capturing apparatus according to the third example.

As FIG. 3C shows, the image capturing apparatus 2A3 includes a picture signal processing circuit 7C having the TG and the frame speed conversion, the CMOS image capturing element 3G of G, the CMOS image capturing element 3R of R, and the CMOS image capturing element 3B of B. The video signal processing circuit 7C includes the FPGA and the frame memory.

The CMOS image capturing element 3R receives inputs of the clock at X3 speed (X3CLK), the horizontal synchronization signal at X3 speed (X3HD), the vertical synchronization signal at X3 speed (X3VD), and outputs the picture signal at X3 speed (X3RVi). The CMOS image capturing element 3G receives inputs of the clock at X4 speed (X4CLK), the horizontal synchronization signal at X4 speed (X4HD), and the vertical synchronization signal at X4 speed with offset phase (Offset X4VD), and outputs the picture signal at X4 speed with offset phase (X4GVi). The CMOS image capturing element 3B receives inputs of the clock at X2 speed (X2CLK), the horizontal synchronization signal at X2 speed (X2HD), and the vertical synchronization signal at X2 speed with offset phase (Offset X 2VD), and outputs the picture signal at X2 speed with offset phase (X2BVi). The picture signal processing circuit 7C receives an input of the picture signal at X3 speed (X3RVi), outputs the picture signal (RVo), receives an input of the picture signal at X4 speed (X4GVi), outputs the picture signal (GVo), receives an input of the picture signal at X2 speed (X2BVi), and outputs the picture signal (BVo).

Figure 2C:
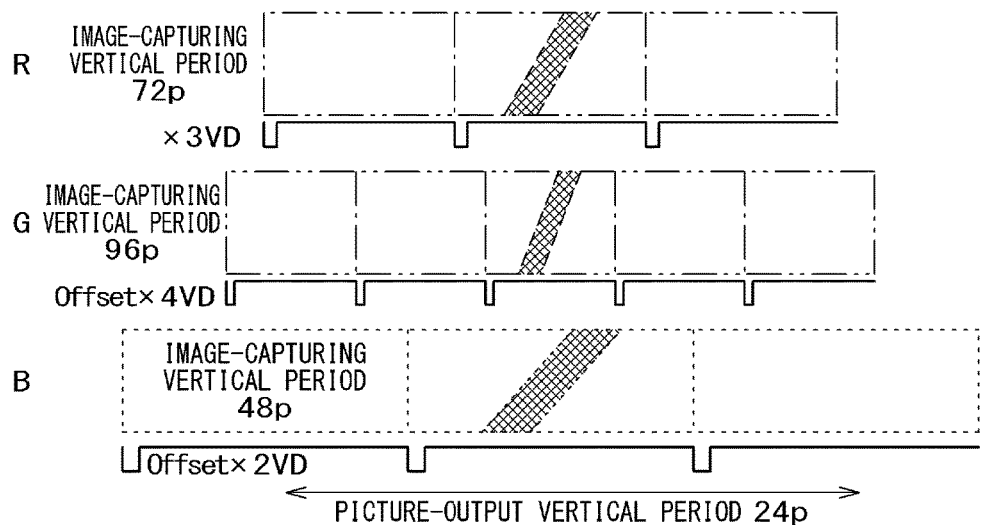
FIG. 2C is a schematic view showing operation of an image capturing apparatus according to a third example.

Referring to FIG. 2C, as the CMOS image capturing element 3G receives an input of the vertical synchronization signal derived from offsetting the vertical synchronization phase of the captured image frame of G by approximately half the vertical synchronization period at X4 (even multiple of) speed, and the CMOS image capturing element 3B receives an input of the vertical synchronization signal derived from offsetting the vertical synchronization phase of the captured image frame of B by approximately half the vertical synchronization period at X2 (even multiple of) speed, each center phase of captured image frames of B, G, R used for the output picture has substantially the same vertical synchronization phase. Assuming that the picture output vertical period is set to 24 p (24 frames/sec.), the image capturing vertical period of R at X3 speed becomes 72 p, the image capturing vertical period of G at X4 speed becomes 96 p, and the image capturing vertical period of B at X2 speed becomes 48 p.

In the case of capturing images of B at X2 speed, R at X3 speed, and G at X4 speed from converted actually measured values of the CMOS image capturing elements of G: −1 dB, R: +2.8 dB, B: +10 dB, the dynamic range is maximized by utilizing the fact that human eyes have the lowest resolution for blue, the next lowest resolution for red, and the high resolution for green.

The image capturing apparatus according to the third example is used for the camera system 20 according to the second embodiment while capturing images of R at X3 speed, G at X4 speed, and B at X2 speed.

The image capturing apparatus according to the third example generates and feeds the vertical synchronization signal derived from aligning the center phase to the CMOS image capturing element of R at X3 speed for image capturing at X3 speed, generates and feeds the vertical synchronization signal derived from offsetting the center phase by approximately half the frame at substantially X4 speed to the CMOS image capturing elements of G1 and G2, or G for image capturing at X4 speed, and generates and feeds the vertical synchronization signal derived from offsetting the center phase by approximately half the frame at substantially X2 speed to the CMOS image capturing element of B for image capturing at X2 speed.

Example 4

An explanation will be made with respect to structure and operation of the image capturing apparatus according to a fourth example (Example 4) referring to FIGS. 3D and 2D. An image capturing apparatus 2B4 according to the fourth example is used for the camera system 10 according to the first embodiment while capturing images of R at X4 speed, G1 at X4 speed, G2 at X4 speed, and B at X2 speed.

Figure 3D:
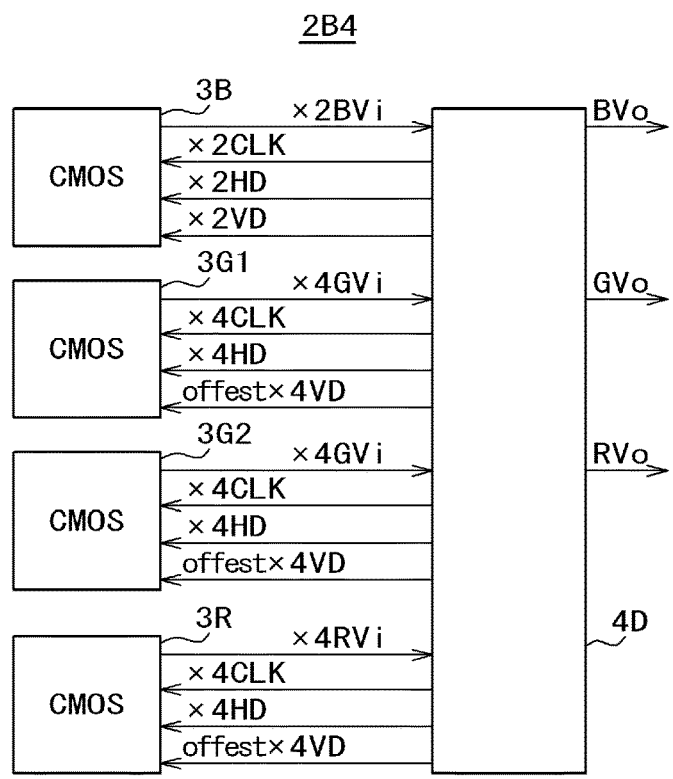
FIG. 3D is a block diagram showing a circuit of the image capturing apparatus according to the fourth example.

As FIG. 3D shows, the image capturing apparatus 2B4 includes a picture signal processing circuit 4D having the TG, the frame speed conversion, and the interpolation process, the CMOS image capturing element 3G1 of G1, the CMOS image capturing element 3G2 of G2, the CMOS image capturing element 3R of R, and the CMOS image capturing element 3B of B. The video signal processing circuit 4D includes the FPGA and the frame memory.

The CMOS image capturing element 3R receives inputs of the clock at X4 speed (X4CLK), the horizontal synchronization signal at X4 speed (X4HD), the vertical synchronization signal at X4 speed with offset phase (Offset X 4VD), and outputs the picture signal at X4 speed with offset phase (X4RVi). The CMOS image capturing element 3G1 receives inputs of the clock at X4 speed (X4CLK), the horizontal synchronization signal at X4 speed (X4HD), and the vertical synchronization signal at X4 speed with offset phase (Offset X 4VD), and outputs the picture signal at X4 speed with offset phase (X4G1Vi). The CMOS image capturing element 3G2 receives inputs of the clock at X4 speed (X4CLK), the horizontal synchronization signal at a multiple speed (X4HD), and the vertical synchronization signal at a multiple speed with offset phase (Offset X 4VD), and outputs the picture signal at X4 speed with offset phase (X4G2Vi). The CMOS image capturing element 3B receives inputs of the clock at X2 speed (X2CLK), the horizontal synchronization signal at X2 speed (X2HD), and the vertical synchronization signal at X2 speed with offset phase (Offset X 2VD), and outputs the picture signal at X2 speed with offset phase (X2BVi). The picture signal processing circuit 4D receives an input of the picture signal at X4 speed (4RVi), outputs the picture signal (RVo), receives inputs of picture signals at X4 speeds (X4G1Vi) and (X4G2Vi), outputs the picture signal (GVo), receives an input of the picture signal at X2 speed (X2BVi), and outputs the picture signal (BVo).

Figure 2D:
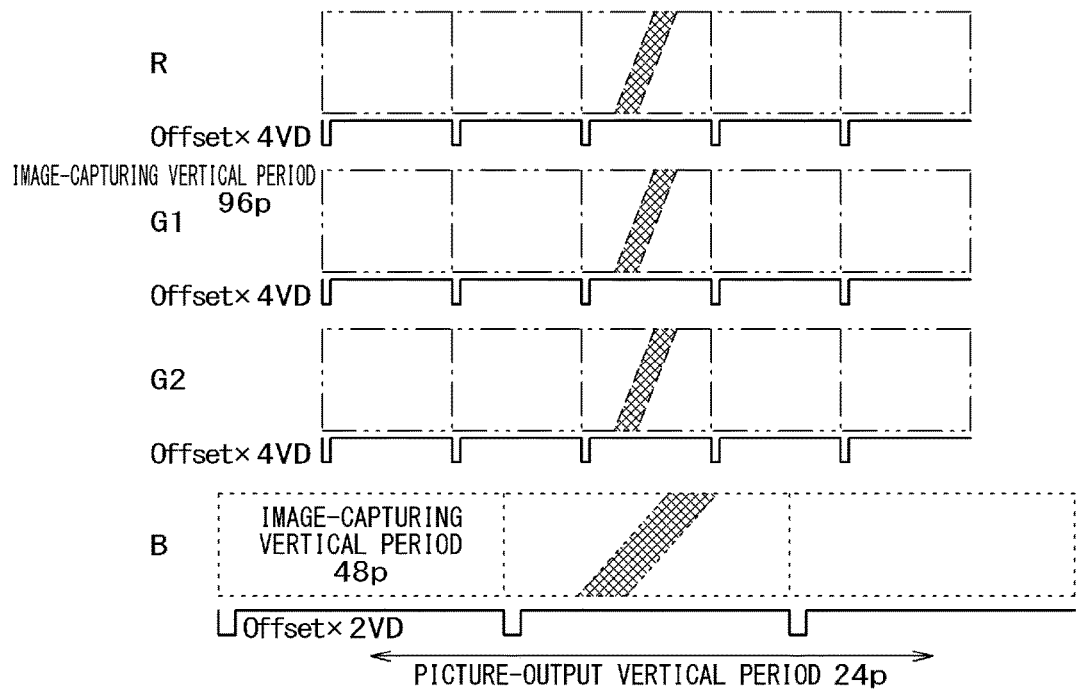
FIG. 2D is a schematic view showing operation of an image capturing apparatus according to a fourth example.

As FIG. 2D shows, the CMOS image capturing element 3R receives an input of the vertical synchronization signal derived from offsetting the vertical synchronization phase of the captured image frame of R by approximately half the vertical synchronization period at X4 (even multiple of) speed, the CMOS image capturing element 3G1 receives an input of the vertical synchronization signal derived from offsetting the vertical synchronization phase of the captured image frame of G1 by approximately half the vertical synchronization period at X4 (even multiple of) speed, the CMOS image capturing element 3G2 receives an input of the vertical synchronization signal derived from offsetting the vertical synchronization phase of the captured image frame of G2 by approximately half the vertical synchronization period at X4 (even multiple of) speed, and the CMOS image capturing element 3B receives an input of the vertical synchronization signal derived from offsetting the vertical synchronization phase of the captured image frame of B by approximately half the vertical synchronization period at a multiple (even multiple of) speed. As a result, each center phase of the captured image frames of B, G including G1 and G2, and R used for the output picture has substantially the same vertical synchronization phase. Assuming that the picture output vertical period is set to 24 p (24 frames/sec.), the image capturing vertical period of R at X4 speed becomes 96 p, the image capturing vertical period of G1 at X4 speed becomes 96 p, the image capturing vertical period of G2 at X4 speed becomes 96 p, and the image capturing vertical period of B at X2 speed becomes 48 p.

In the case of capturing images of B at the equal speed, R at X2 speed, G1 at X2 speed, and G2 at X2 speed from actually measured values of the CMOS image capturing elements of G1: 5 dB, G2: 5 dB, R: +2.8 dB, and B: +10 dB, the dynamic range is maximized by utilizing the fact that human eyes have the lowest resolution for blue.

The image capturing apparatus according to the fourth example is used for the camera system 10 according to the first embodiment while capturing images of R at X4 speed, G1 at X4 speed, G2 at X4 speed, and B at X2 speed.

The image capturing apparatus according to the fourth example generates and feeds the vertical synchronization signal derived from offsetting the center phase by approximately half the frame at substantially X4 speed to the CMOS image capturing element of R at X4 speed for image capturing at X4 speed, generates and feeds the vertical synchronization signal derived from offsetting the center phase by approximately half the frame at substantially X4 speed to the CMOS image capturing elements of G1 and G2, or G at X4 speed for image capturing at X4 speed, and generates and feeds the vertical synchronization signal derived from offsetting the center phase by approximately half the frame at substantially X2 speed to the CMOS image capturing element of B at X2 speed for image capturing at X2 speed.

Comparative Example 1

An explanation will be made with respect to structure and operation of the image capturing apparatus according to a first comparative example (Comparative Example 1) referring to FIGS. 3E and 2E. An image capturing apparatus 2AR1 according to the first comparative example is used for the camera system 10 according to the first embodiment while capturing images of R at X2 speed, G at X2 speed, and B at X2 speed, respectively.

Figure 3E:
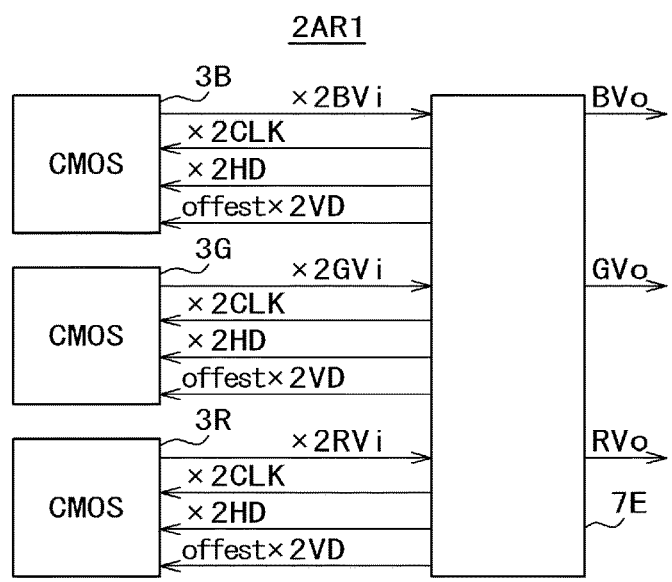
FIG. 3E is a block diagram showing a circuit of the image capturing apparatus according to the first comparative example.

As FIG. 3E shows, the image capturing apparatus 2AR1 includes a picture signal processing circuit 7E having the TG and the frame speed conversion, the CMOS image capturing element 3G of G, the CMOS image capturing element 3R of R, and the CMOS image capturing element 3B of B. The picture signal processing circuit 7E includes the FPGA and the frame memory.

The CMOS image capturing element 3R receives inputs of the clock at X2 speed (X2CLK), the horizontal synchronization signal at X2 speed (X2HD), the vertical synchronization signal at X2 speed with offset phase (Offset X 2VD), and outputs the picture signal at X2 speed with offset phase (Offset X 2RVi). The CMOS image capturing element 3G receives inputs of the clock at X2 speed (X2CLK), the horizontal synchronization signal at X2 speed (X2HD), the vertical synchronization signal with offset phase at X2 speed (Offset X 2VD), and outputs the picture signal at X2 speed with offset phase (Offset X 2RVi). The CMOS image capturing element 3B receives inputs of the clock at X2 speed (X2CLK), the horizontal synchronization signal at X2 speed (X2HD), the vertical synchronization signal at X2 speed with offset phase (Offset X 2VD), and outputs the picture signal at X2 speed with offset phase (X2BVi). The picture signal processing circuit 7E receives an input of the picture signal at X2 speed (X2RVi), outputs the picture signal (RVo), receives an input of the picture signal at X2 speed (X2GVi), outputs the picture signal (GVo), receives an input of the picture signal at X2 speed (X2BVi), and outputs the picture signal (BVo).

Figure 2E:
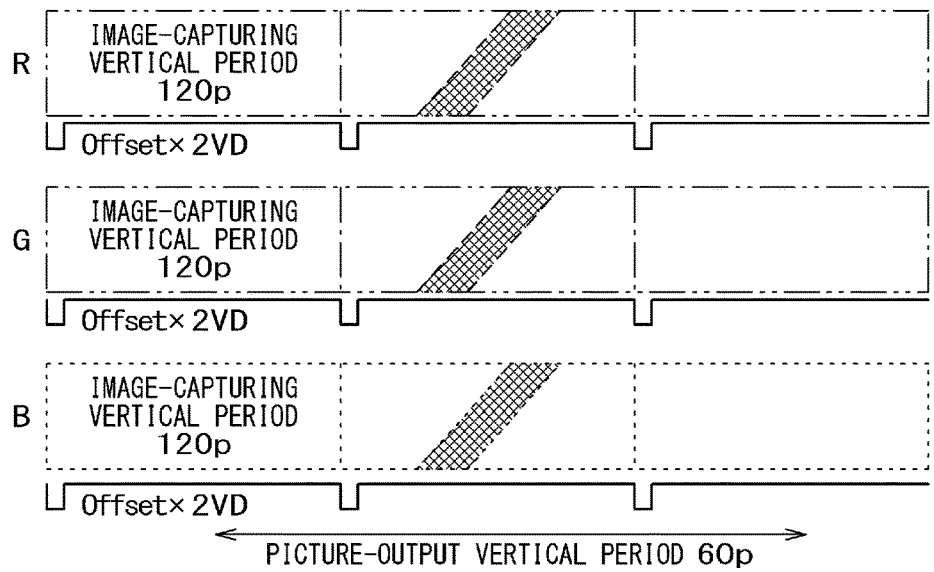
FIG. 2E is a schematic view showing operation of an image capturing apparatus according to a first comparative example.

As FIG. 2E shows, the CMOS image capturing element 3R receives an input of the vertical synchronization signal derived from offsetting the vertical synchronization phase of the captured image frame of R by approximately half the vertical synchronization period at X2 speed (even multiple of speed). The CMOS image capturing element 3G receives an input of the vertical synchronization signal derived from offsetting the vertical synchronization phase of the captured image frame of G by approximately half the vertical synchronization period at X2 (even multiple of) speed. The CMOS image capturing element 3B receives an input of the vertical synchronization signal derived from offsetting the vertical synchronization phase of the captured image frame of B at 2-multiple (even multiple of) speed. As a result, each center phase of the captured image frames of B, G, R used for the output picture has substantially the same vertical synchronization phase. Assuming that the picture output vertical period is set to 60 p (60 frames/sec.), the image capturing vertical period of R at X2 speed becomes 120 p, the image capturing vertical period of G at X2 speed becomes 120 p, and the image capturing vertical period of B at X2 speed becomes 120 p.

In the case of capturing images of B at X2 speed, R at X2 speed, and G at X2 speed from converted actually measured values of the CMOS image capturing elements of G: −1 dB, R: +2.8 dB, and B: +10 dB, the dynamic range cannot be improved owing to the error of 11 dB.

Comparative Example 2

An explanation will be made with respect to structure and operation of the image capturing apparatus according to a second comparative example (Comparative Example 2) referring to FIGS. 3F and 2F. An image capturing apparatus 2BR2 according to the second comparative example is used for the camera system 20 according to the second embodiment, while capturing images of R at X3 speed, G1 at X3 speed, G2 at X3 speed, and B at the equal speed, respectively.

Figure 3F:
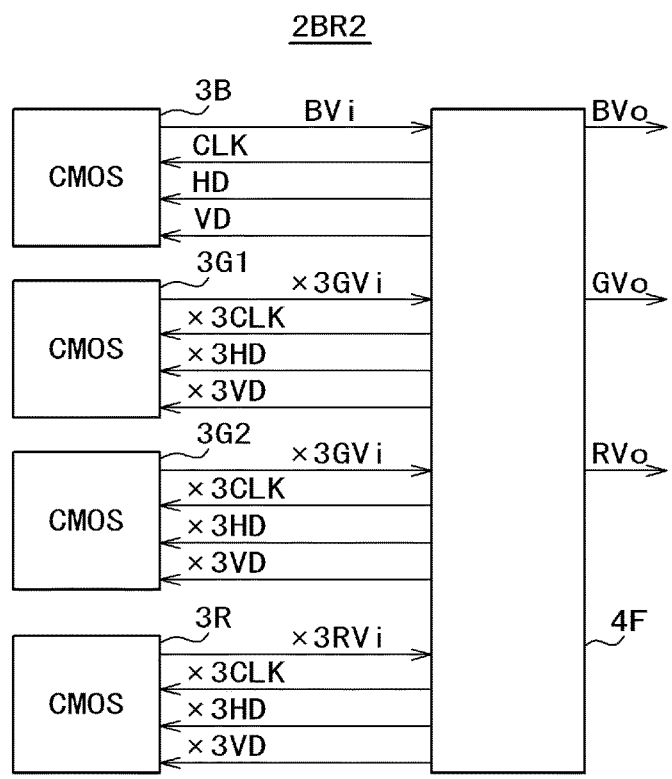
FIG. 3F is a block diagram showing a circuit of the image capturing apparatus according to the second comparative example.

As FIG. 3F shows, the image capturing apparatus 2BR2 includes a picture signal processing circuit 4F having the TG, the frame speed conversion, and the interpolation process, the CMOS image capturing element 3G1 of G1, the CMOS image capturing element 3G2 of G2, the CMOS image capturing element 3R of R, and the CMOS image capturing element 3B of B. The picture signal processing circuit 4F includes the FPGA and the frame memory.

The CMOS image capturing element 3R receives inputs of the clock at X3 speed (X3CLK), the horizontal synchronization signal at X3 speed (X3HD), the vertical synchronization signal at X3 speed (X3VD), and outputs the picture signal at X3 speed (X3RVi). The CMOS image capturing element 3G1 receives inputs of the clock at X3 speed (X3CLK), the horizontal synchronization signal at X3 speed (X3HD), the vertical synchronization signal at X3 speed (X3VD), and outputs the video signal at X3 speed (X3G1Vi). The CMOS image capturing element 3G2 receives inputs of the clock at X3 speed (X3CLK), the horizontal synchronization signal at X3 speed (X3HD), the vertical synchronization signal at X3 speed (X3VD), and outputs the picture signal at X3 speed (X3G2Vi). The CMOS image capturing element 3B receives inputs of the clock at the equal speed (CLK), the horizontal synchronization signal at the equal speed (HD), the vertical synchronization signal at the equal speed (VD), and outputs the picture signal at the equal speed (BVi). The picture signal processing circuit 4F receives an input of the picture signal at X3 speed (X3RVi), outputs the picture signal (RVo), receives inputs of the picture signals each at X3 speed (X3G1Vi) and (X3G2Vi), outputs the picture signal (GVo), receives an input of the picture signal at the equal speed (BVi), and outputs the picture signal (BVo).

Figure 2F:
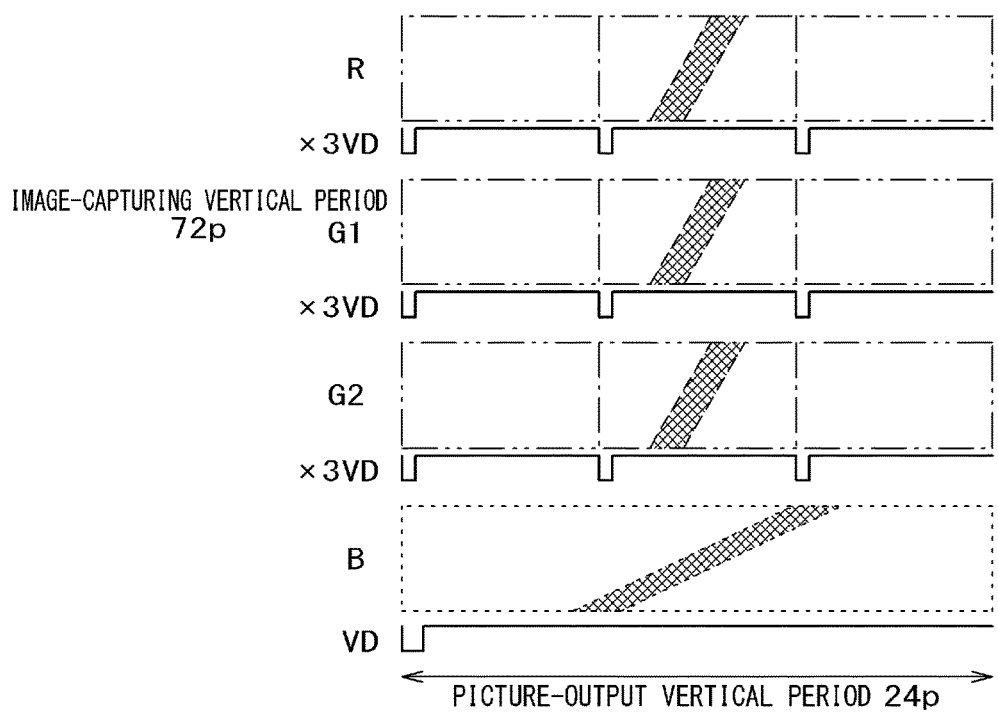
FIG. 2F is a schematic view showing operation of an image capturing apparatus according to a second comparative example.

As FIG. 2F shows, the CMOS image capturing element 3R receives an input of the vertical synchronization signal without offsetting the vertical synchronization phase of the captured image frame of R by approximately half the vertical synchronization period at X3 (odd multiple of) speed. The CMOS image capturing element 3G1 receives an input of the vertical synchronization signal without offsetting the vertical synchronization phase of the captured image frame of G1 by approximately half the vertical synchronization period at X3 (odd multiple of) speed. The CMOS image capturing element 3G2 receives an input of the vertical synchronization signal derived from offsetting the vertical synchronization phase of the captured image frame of G2 by approximately half the vertical synchronization period at X3 (odd multiple of) speed. The CMOS image capturing element 3B receives an input of the vertical synchronization signal without offsetting the vertical synchronization phase of the captured image frame of B at the equal speed. As a result, each center phase of the captured image frames of B, G including G1 and G2, and R used for the output picture has substantially the same vertical synchronization phase. Assuming that the picture output vertical period is set to 24 p (24 frames/sec.), the image capturing vertical period of R at X3 speed becomes 72 p, the image capturing vertical period of G1 at X3 speed becomes 72 p, the image capturing vertical period of G2 at X3 speed becomes 72 p, and the image capturing vertical period of B at the equal speed becomes 24 p.

In the case of capturing images of B at the equal speed, R at X3 speed, G1 at X3 speed, G2 at X3 speed from actually measured values of the CMOS image capturing elements of G1: 5 dB, G1: 5 dB, R: +2.8 dB, and B: +10 dB, the values of G1: +14 dB, G2: +14 dB, R: +13 dB, and B: +10 dB are still permissible in spite of deviation from the maximum dynamic range by 2 dB.

The present invention made by the inventor has been described in detail based on the embodiments and examples. It is to be understood that the present invention is not limited to those embodiments and examples, but may be modified into various forms.

REFERENCE SIGNS LIST

1: lens,
2A, 2A1, 2A3, 2AR1: image capturing apparatus,
2B, 2B2, 2B4, 2BR2: image capturing apparatus,
3G1: CMOS image capturing element of first green (G1),
3G2: CMOS image capturing element of second green (G2),
3G: CMOS image capturing element of green (G),
3R: CMOS image capturing element of red (R),
3B: CMOS image capturing element of blue (B),
4, 4B, 4D, 4F: picture signal processing circuit,
5: four-color-separation optical system,
6: CPU,
7, 7A, 7C, 7E: picture signal processing circuit,
8: three-color-separation optical system,
10: camera system,
20: camera system

The invention claimed is:
1. An image capturing method for an image capturing apparatus having a color-separation optical system and three or more CMOS image capturing elements, comprising:
capturing a plurality of image frames of B at a speed of an integer N multiple of a number of output picture frames, capturing a plurality of image frames of G, or G1 and G2, at a speed of an integer M multiple of an integer N+1 or more, and capturing a plurality of image frames of R at a speed of the integer M multiple of the integer N+1 or more;

offsetting vertical synchronization phases of the captured image frames of B, G, and R, or B, G1, G2, and R, which are to be used for an output picture by approximately half a vertical synchronization period of an even multiple of speed such that each center phase of the captured image frames of B, G, and R, or B, G1, G2, and R, has approximately a same vertical synchronization phase; and using, for the output picture, vertical effective pictures of the captured image frames of B, G, and R, or B, G1, G2, and R, having approximately the same vertical synchronization phase, wherein the image capturing method comprises at least one of the group consisting of:

(a) generating and feeding a vertical synchronization signal derived from offsetting the center phase by approximately half the center phase at substantially X2 speed to a CMOS image capturing element of R at X2 speed for image capturing at X2 speed, generating and feeding a vertical synchronization signal derived from aligning the center phase at X3 speed to a CMOS image capturing element of G, or G1 and G2, for image capturing at X3 speed, and generating and feeding a vertical synchronization pulse derived from aligning the center phase at the equal speed to a CMOS image capturing element of B for image capturing at the equal speed;

(b) generating and feeding a vertical synchronization signal derived from offsetting the center phase by approximately half the frame at substantially X2 speed to the CMOS image capturing element of R at X2 speed for image capturing at X2 speed, generating and feeding a vertical synchronization signal derived from offsetting the center phase by approximately half the frame at substantially X2 speed to the CMOS image capturing element of G, or G1 and G2, at X2 speed for image capturing at X2 speed, and generating and feeding a vertical synchronization signal derived from aligning the center phase to the CMOS image capturing element of B at the equal speed for image capturing at the equal speed;

(c) generating and feeding a vertical synchronization signal derived from aligning the center phase to the CMOS image capturing element of R at X3 speed for image capturing at X3 speed, generating and feeding a vertical synchronization signal derived from offsetting the center phase by approximately half the frame at substantially X4 speed to the CMOS image capturing element of G, or G1 and G2, at X4 speed for image capturing at X4 speed, and generating and feeding a vertical synchronization signal derived from offsetting the center phase by approximately half the frame at substantially X2 speed to the CMOS image capturing element of B at X2 speed for image capturing at X2 speed; and (d) generating and feeding a vertical synchronization signal derived from offsetting the center phase by approximately half the frame at substantially X4 speed to the CMOS image capturing element of R at X4 speed for image capturing at X4 speed, generating and feeding a vertical synchronization signal derived from offsetting the center phase by approximately half the frame at substantially X4 speed to the CMOS image capturing element of G1 and G2, or G at X4 speed for image capturing at X4 speed, and generating and feeding a vertical synchronization signal derived from offsetting the center phase by approximately half the frame at substantially X2 speed to the CMOS image capturing element of B at X2 speed for image capturing at X2 speed.

2. An image capturing apparatus including a color-separation optical system and CMOS image capturing elements as three or more focal plane shutters, comprising:

a timing circuit which generates and applies a vertical synchronization signal derived from offsetting vertical synchronization phases of captured image frames of B, G, and R, or B, G1, G2, and R, by approximately half a vertical synchronization period at an even multiple of speed, and generates a vertical synchronization signal without offsetting the vertical synchronization period at an odd multiple of speed;

a CMOS image capturing element for image capturing of B at a speed of an integer N multiple of a number of output picture frames in synchronization with the vertical synchronization signal derived from offsetting by approximately half the vertical synchronization period at an even multiple of speed;

a CMOS image capturing element for image capturing of G, or G1 and G2, at a speed of an integer M multiple of an integer N+1 or more in synchronization with the vertical synchronization signal without offsetting the vertical synchronization period at an odd multiple of speed;

a CMOS image capturing element for image capturing of R at a speed of the integer M multiple of the number of the integer N+1 or more in synchronization with the vertical synchronization signal without offsetting the vertical synchronization period at the odd multiple of speed; and a picture signal processing circuit including frame speed conversion means, wherein the image capturing apparatus comprises at least one of the group consisting of:

(a) the timing circuit which generates and feeds the vertical synchronization signal derived from offsetting the center phase by approximately half the frame at substantially X2 speed to the CMOS image capturing element of R at X2 speed, generates and feeds the vertical synchronization signal derived from aligning the center phase to the CMOS image capturing element of G, or G1 and G2, at X3 speed, generates and feeds the vertical synchronization signal derived from aligning the center phase to the CMOS image capturing element of B at the equal speed, and the CMOS image capturing element of R executes image capturing at X2 speed, the CMOS image capturing element of G, or G1 and G2, executes image capturing at X3 speed, and the CMOS image capturing element of B executes image capturing at the equal speed;

(b) the timing circuit which generates and feeds the vertical synchronization signal derived from offsetting the center phase by half the frame at substantially X2 speed to the CMOS image capturing element of R at X2 speed, generates and feeds the vertical synchronization signal derived from offsetting the center phase by approximately half the frame at substantially X2 speed to the CMOS image capturing element of G, or G1 and G2, at X2 speed, generates and feeds the vertical synchronization signal derived from aligning the center phase to the CMOS image capturing element of B at the equal speed, and the CMOS image capturing element of R executes image capturing at X2 speed, the CMOS image capturing element of G, or G1 and G2, executes image capturing at X2 speed, and the CMOS image capturing element of B executes image capturing at the equal speed;

(c) the timing circuit generates and feeds the vertical synchronization signal derived from aligning the center phase to the CMOS image capturing element of R at X3 speed, generates and feeds the vertical synchronization signal derived from offsetting the center phase by approximately half the frame at substantially X4 speed to the CMOS image capturing element of G, or G1 and G2, at X4 speed, generates and feeds the vertical synchronization signal derived from offsetting the center phase by approximately half the frame at substantially X2 speed to the CMOS image capturing element of B at X2 speed, and the CMOS image capturing element of R executes image capturing at X3 speed, the CMOS image capturing element of G, or G1 and G2, executes image capturing at X4 speed, and the CMOS image capturing element of B executes image capturing at X2 speed; and (d) the timing circuit which generates and feeds the vertical synchronization signal derived from offsetting the center phase by approximately half the frame at substantially X4 speed to the CMOS image capturing element of R at X4 speed, generates and feeds the vertical synchronization signal derived from offsetting the center phase by half the frame at substantially X4 speed to the CMOS image capturing element of G, or G1 and G2, at X4 speed, generates and feeds the vertical synchronization signal derived from offsetting the center phase by half the frame at substantially X2 speed to the CMOS image capturing element of B at X2 speed, and the CMOS image capturing element of R executes image capturing at X4 speed, the CMOS image capturing element of G, or G1 and G2, executes image capturing at X4 speed, and the CMOS image capturing element of B executes image capturing at X2 speed.

* * * * *